(12) United States Patent
Hochstatter et al.

(10) Patent No.: US 9,311,672 B2
(45) Date of Patent: Apr. 12, 2016

(54) SYSTEMS AND METHODS FOR FRAUD DETECTION USING A COOPERATIVE DATA EXCHANGE

(75) Inventors: Thomas G. Hochstatter, Austin, TX (US); John Leonard, Austin, TX (US); Christopher W. McKinzie, Lakeway, TX (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 12 days.

(21) Appl. No.: 13/571,191

(22) Filed: Aug. 9, 2012

(65) Prior Publication Data

US 2014/0046827 A1 Feb. 13, 2014

(51) Int. Cl.
*G06Q 40/00* (2012.01)
*G06Q 40/02* (2012.01)
*G06Q 20/40* (2012.01)

(52) U.S. Cl.
CPC .......... *G06Q 40/02* (2013.01); *G06Q 20/4016* (2013.01)

(58) Field of Classification Search
CPC ....... G06Q 40/04; G06Q 40/00; G06Q 30/02; G06Q 40/02; G06Q 20/4016
USPC ................................................ 705/35–40
See application file for complete search history.

(56) References Cited

U.S. PATENT DOCUMENTS

| | | | |
|---|---|---|---|
| 7,251,624 B1* | 7/2007 | Lee et al. | 705/35 |
| 7,610,216 B1* | 10/2009 | May et al. | 705/18 |
| 8,548,904 B1* | 10/2013 | Bear et al. | 705/38 |
| 2002/0002512 A1* | 1/2002 | Harpale | 705/26 |
| 2002/0174000 A1 | 11/2002 | Katz et al. | |
| 2003/0097330 A1* | 5/2003 | Hillmer et al. | 705/38 |
| 2007/0124238 A1* | 5/2007 | Hogg et al. | 705/38 |
| 2008/0195528 A1* | 8/2008 | Keithley | 705/38 |
| 2008/0208760 A1* | 8/2008 | Keithley | G06Q 20/04 705/75 |
| 2009/0132316 A1 | 5/2009 | Florance et al. | |
| 2010/0153244 A1* | 6/2010 | Sharma | 705/30 |
| 2010/0241557 A1* | 9/2010 | Galit et al. | 705/38 |
| 2011/0059772 A1 | 3/2011 | Want et al. | |
| 2011/0093335 A1* | 4/2011 | Fordyce et al. | 705/14.53 |
| 2011/0131122 A1* | 6/2011 | Griffin | G06Q 40/00 705/35 |
| 2011/0208642 A1* | 8/2011 | Shader et al. | 705/39 |
| 2011/0295722 A1* | 12/2011 | Reisman | G06Q 30/0201 705/27.1 |
| 2012/0096002 A1 | 4/2012 | Sheehan et al. | |
| 2012/0109749 A1* | 5/2012 | Subramanian et al. | 705/14.53 |

OTHER PUBLICATIONS

Office Action dated Mar. 5, 2013 in U.S. Appl. No. 13/160,361.
Office Action Restriction dated Dec. 19, 2012 in U.S. Appl. No. 13/160,361.
Notice of Allowance dated Nov. 6, 2013 in U.S. Appl. No. 13/160,361.

* cited by examiner

*Primary Examiner* — Edward Baird
(74) *Attorney, Agent, or Firm* — Snell & Wilmer L.L.P.

(57) ABSTRACT

A method is provided comprising receiving, at a first node, transactional data associated with a consumer (wherein the first node comprises a processor and a tangible, non-transitory memory), receiving, at the first node, a credit approval request associated with the consumer, wherein the credit approval request is associated with a proposed transaction, determining, by the first node, whether the transactional data conforms with the proposed transaction, and at least one of approving and denying the credit approval request in response to the determination.

12 Claims, 6 Drawing Sheets

SYSTEMS AND METHODS FOR FRAUD DETECTION USING A COOPERATIVE DATA EXCHANGE

FIELD

The disclosure generally relates to financial analysis, and more particularly, to systems and methods for fraud detection using a cooperative data exchange.

BACKGROUND

End consumer-facing business entities tend to have limited data relating to their customers. While a business entity may have a customer list containing demographic information about a customer and/or a set of prior transactions conducted by the business entity and the customer, many business entities may not have additional information about their customers. Moreover, it is often difficult to derive insight from this limited data set. It would thus be useful for a business entity to enhance the value of this limited data set to gain additional insights into its consumer base through, for example, a cooperative data exchange. Moreover, fraud detection systems may harness the additional transactional data to improve accuracy.

SUMMARY

Various systems and methods for fraud detection and data analysis are provided herein in various embodiments. A system may be configured for, and a method may comprise, receiving, at a first node, transactional data associated with a consumer (wherein the first node comprises a processor and a tangible, non-transitory memory), receiving, at the first node, a credit approval request associated with the consumer, wherein the credit approval request is associated with a proposed transaction, determining, by the first node, whether the transactional data conforms with the proposed transaction and at least one of approving and denying the credit approval request in response to the determination.

BRIEF DESCRIPTION OF THE DRAWINGS

The above and other features and advantages are hereinafter described in the following detailed description of exemplary embodiments to be read in conjunction with the accompanying drawing figures, wherein like reference numerals are used to identify the same or similar parts in the similar views, and.

DETAILED DESCRIPTION

Figure 1:
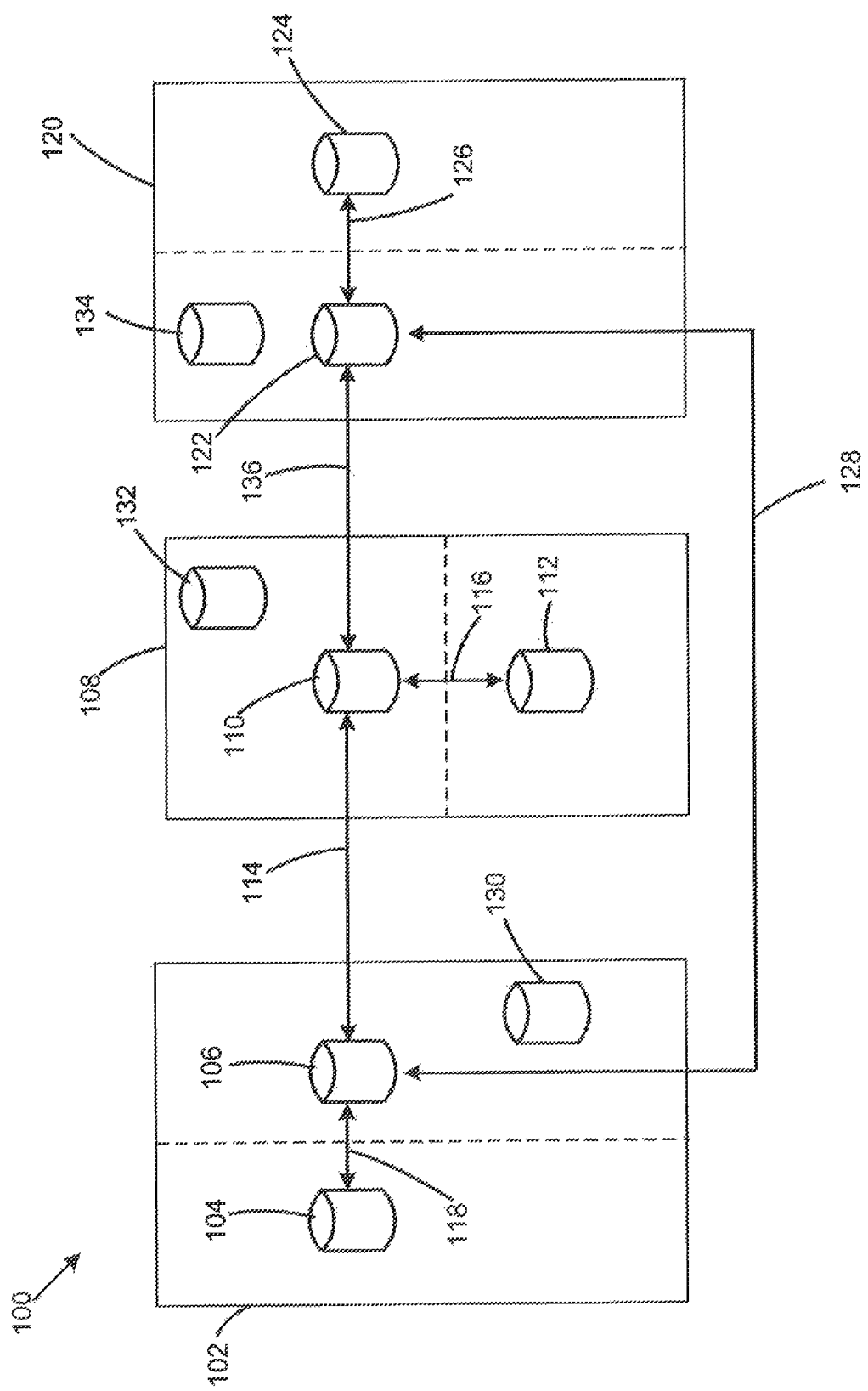
FIG. 1 illustrates a method, according to various embodiments.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. Terms similar to "connect" may include a partial or full connection and/or a partial or full interface.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles. The disclosure may be implemented as a method, system or in a computer readable medium.

Business entities (for example, merchants) may improve their businesses by harnessing data related to their customers and consumers in general. As used herein, the term "consumer" may mean any person or entity that consumes or uses an item. As used herein, a customer may mean a person or entity that has purchased and/or may purchase in the future an item from a given business entity, such as a merchant. Thus, a customer list may be a list of people or entities that have purchased or may purchase an item from another entity, such as a merchant.

In various embodiments, cooperative data exchange may be useful for businesses to gain insight into their customers and consumers in general. Cooperative data exchange may also allow businesses to view data relating to their competitors and providers of complementary goods and services. Analytics may be performed on data sets created through a cooperative data exchange to improve business performance and prospects.

Cooperative data exchanges may be used to exchange transactional data at a low level of detail. For example, transactional data, as used herein, may comprise SKU data, kind code data, and service code data related to line items in a transaction. A cooperative data exchange may be used to share transactional data with a credit issuer. The credit issuer may then use the transactional data to better understand its consumers.

Fraud detection in the credit card, charge card, and debit card transaction context may be based upon an understanding of a consumer's general spending habits, preferences and tendencies. However, a credit issuer typically has only limited data relating to a consumer's spending history and/or credit approval requests. The use of transactional data allows a greater level of granularity to be used in fraud detection than previously possible.

Cooperative data exchange 100 is illustrated in FIG. 1. A cooperative data exchange may comprise multiple nodes. For example, a cooperative data exchange may comprise a first node, second node, third node, fourth node, etc. A node may be any system that may comprise a data store and, in various embodiments, also comprise a processor and/or a memory. A node may comprise, for example, a computer system, smart phone, or tablet computing device, as described herein. A node may also be connected to any network, including those described herein. For example, a node may be connected to the Internet, such as directly or through an intranet. A node may also be connected to a virtual private network, including the types described herein.

With continuing reference to FIG. 1, in various embodiments, node 102 communicates through secure channel 114 with node 108. Node 108 communicates through secure channel 136 with node 120. Node 120 communicates with node 102 through secure channel 128. As used herein, the phrase secure channel is used interchangeably with the phrase secure connection, and may include fully secure, substantially secure or partially secure.

Node 102 may comprise private facing data store 104 and public facing data store 106. Private facing data store 104 may not connect to or otherwise access or be accessed directly by other nodes on cooperative data exchange 100. However, public facing data store 106 may connect directly to public facing data stores of one or more other nodes on cooperative data exchange 100. Connection 118 facilitates communication between private facing data store 104 and public facing data store 106.

Node 102 may also comprise lookup module 130. Lookup module 130 may comprise a lookup table. The lookup table may comprise addresses of other nodes on cooperative data exchange 100. For example, the lookup table may comprise IP addresses, domain names, port information, and other protocol information (e.g., security protocol information) relating to other nodes on cooperative data exchange 100. In this manner, the lookup table may be used identify where and how to establish communication from node 102 to another node on cooperative data exchange 100. For example, the lookup table may comprise an entry for node 120 that exists at IP address 12.34.567.89, communicates on port 587, and requires a TLS connection. In the event node 102 would like to connect to a desired node that is not present on lookup module 130, node 102 may connect with another known node and request (i.e., query) the lookup module of the known node for the address of the desired node. If the known node does not have the requested information, node 102 may query other known nodes, either simultaneously or sequentially, to determine the desired node's address. For example, if node 102 would like to connect to node 120 and does not know the correct port number, node 102 may query the lookup module of node 108 to determine the appropriate port. Node 102 may continue to access the lookup module for each node contained in lookup module 130.

Figure 4:
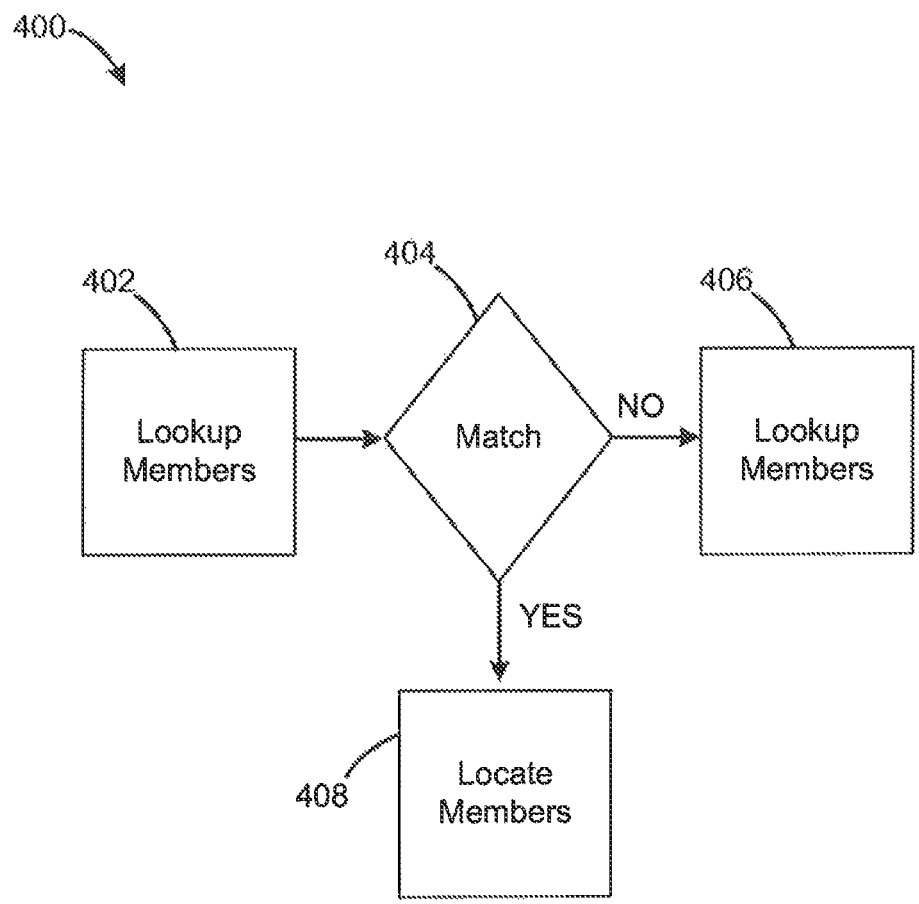
FIG. 4 illustrates a lookup methodology, according to various embodiments.

With momentary reference to FIG. 4, lookup methodology 400 according to various embodiments is shown. A node may look up other nodes in its own lookup module at lookup members 402. At decision point 404, if there is a match between the desired node and the lookup table of the node's lookup module, then locate members 408 is performed. Locate members 408 may include resolving a domain name with a domain name system and/or establishing a secure channel with the desired node. A secure channel may be any encrypted channel or connextion, such as, for example, via virtual private network, tunneling protocol (e.g., ssh tunnel), SSL, TLS, or the like, as further described herein. If there is no match between the desired node and the lookup table of the node's lookup module at decision point 404, then lookup members 406 is performed. Lookup members 406 may comprise querying the lookup modules of other, known nodes to find the desired node.

Referring back to FIG. 1, node 108 may comprise private facing data store 112 and public facing data store 110. Private facing data store 112 may not connect to or otherwise access or be accessed directly by other nodes on cooperative data exchange 100. However, public facing data store 110 may connect directly to public facing data stores of one or more other nodes on cooperative data exchange 100. Connection 116 facilitates communication between private facing data store 112 and public facing data store 110.

Node 120 may comprise private facing data store 124 and public facing data store 122. Private facing data store 124 may not connect to or otherwise access or be accessed directly by other nodes on cooperative data exchange 100. However, public facing data store 122 may connect directly to public facing data stores of one or more other nodes on cooperative data exchange 100. Connection 126 facilitates communication between private facing data store 124 and public facing data store 122.

Node 102 may initiate and/or use secure channel 114 to communicate with public facing data store 110 of node 108. In like manner, node 102 may initiate and/or use secure channel 128 to communicate with public facing data store 122 of node 120.

Cooperative data exchanges may be used to share and analyze business information. Merchants may keep customer lists. Customer lists may be populated with customers who "opt-in" to merchant frequent buyer programs (e.g., frequent flyer programs and in-store coupon programs) and/or customers who join a membership-driven merchant (e.g., a warehouse "club"). Moreover, customer lists may be populated with transactional data not tied to an individual's name or other identifying information. Thus, a customer list may contain a customer name, a transaction history (including stock keeping units "SKUs" purchased), and/or customer contact information. Any individual customer on a customer list may be referred to as a first customer or a reference customer.

For merchants who do not keep customer lists, but retain transactional data, a merchant may possess data relating to a particular transaction (e.g., time, date, amount purchased, geographic location, etc). Such data is still considered to be related to a reference customer, even though the reference customer's name is not known.

Customer lists, merchant transactional data and the like, standing alone, have a limited ability to provide a merchant with insight into its customers and consumers generally. Thus, merchants and other businesses may find it advantageous to create a node on a cooperative data exchange, obtain shared data from other nodes, join or merge the shared data with their own data and perform analytics on such data.

In various embodiments, a node may comprise a private data store and/or a public data store that may comprise internal data. "Internal data" and terms similar to "internal data" may include any data a credit issuer possesses or acquires pertaining to a particular consumer or group of consumers. Internal data may be gathered from a transaction system, such as a closed loop transaction system. Internal data may be gathered before, during, or after a relationship between the credit issuer and the transaction account holder (e.g., the consumer or buyer). Such data may include consumer demographic data. Consumer demographic data may include any data pertaining to a consumer. Consumer demographic data may include consumer name, gender, age, address (including ZIP code and 4 digit extension, also known as "ZIP+4"), telephone number, email address, employer and social security number. Consumer transactional data may include any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

In various embodiments, as discussed above, a node may contain internal data in a private facing data store, a public facing data store, or a combination thereof. In various embodiments, a node may contain internal data in a private facing data store and then a subset of the internal data in a public facing data store. For example, the internal data in a public facing data store may not contain personally identifiable information, or it may contain a summary of internal data found in the private facing data store, or it may contain data derived from internal data, such as size of wallet or share of wallet information. A size of wallet may comprise a measure of the amount a consumer spends using a credit, debit, and/or charge card. A share of wallet may comprise a measure of the relative share of a consumer's size of wallet that is spent in one industry or one merchant. A secure connection, such as secure channel 114, may be used to extract internal data from private facing data store into public facing data store.

Internal data placed in the public facing data store may be indexed or otherwise processed to preserve the underlying internal data as provide while still communicating valuable insight into a given consumer, consumer group, business, or industry. Such internal data may be referred to as processed internal data.

The internal data may be indexed, for example when stored in a public facing data store. For example, an index of data derived from internal data may comprise a measurement that relates the data to another data set. For example, the national average size of wallet of a consumer may be set arbitrarily at 100. A particular consumer may have an average size of wallet twice that of the national average and, thus, could have an indexed value of 200. In this manner, the indexed value could be placed in a public facing data store, so nodes that request this information do not receive the underlying data, but an indexed value as measured against a large pool of other consumers. Indexing may be useful in that is provides concrete trend information yet preserves specific aggregate data. In various embodiments, a large collection of internal data may exist on a node.

Internal data may also be processed to reflect the underlying data. For example, the internal data may comprise a metric that represents spend in various ranges over a given time period, such as the last quarter or year. As an example, a score of 5000 may indicate that ac consumer spent between $5000 and $6000 in the given time period. The internal data may include a range of numbers or a numeric indicator that indicates the trend of a consumer's spend over a given time period. For example, a trend score of +4 may indicate that the consumer has increased spending over the previous 4 months, while a trend score of –4 may indicate that the consumer has decreased spend over the previous 4 months. Further, aggregate data may be derived from the internal data relating to the purchasing of a population of transaction account users within a given industry.

In various embodiments, a node may comprise an analytics module or may be in communication with an analytics module. An analytics module may be any device, software, or combination thereof that is configured to perform analytics. Analytics may comprise one or more statistical analyses or other manipulation of data. The output of the analytics module may provide insight into consumer behaviors and may be used in a variety of contexts, as described herein.

Figure 2:
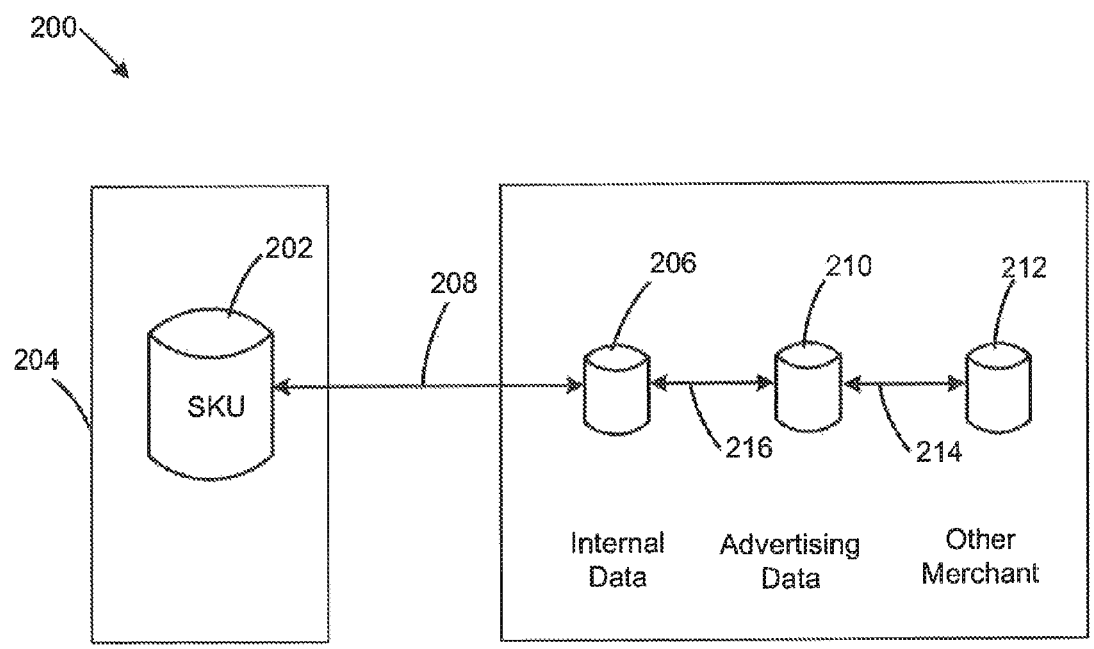
FIG. 2 illustrates a method including a select strategy, according to various embodiments.

With reference to FIG. 2, portion of a cooperative data exchange 200 is shown. Node 204 may comprise a public facing data store 202 that houses transactional information from a first merchant, which may include transaction date, transaction time, transaction amount, SKUs in a given transaction, customer name, customer address (including ZIP+4), customer age, and customer gender. Node 204 uses secure channel 208 to connect from the public facing data stores of other various nodes, such as data stores 206, 210 and 212. Data store 206 may comprise internal data. Data store 210 may comprise advertising data that may comprise data relating to present and historical advertising campaigns and customers who took an action in response to such advertising campaigns. Data store 212 may comprise transactional information from a second merchant, which may include transaction date, transaction time, transaction amount, SKUs in a given transaction, customer name, customer address (including ZIP+4), customer age, customer gender, and or data derived from the same.

Public facing data store may further comprise customers who have purchased a specific product, customers identified as reaching a certain level in a sales cycle, customers who have made purchases through a particular sales channel, customers who have responded to marketing campaigns based on specific offer types, product bundling/product types, specific seasons, marketing creative and specific advertising/marketing channels, customers who are defined as high value through purchase amount (i.e., historical transactional amount), customer geographic information (including instantaneous geographic information obtained from a digital device such as a GPS-equipped smartphone and historical instantaneous geographic information obtained from similar sources) customer preference for a particular merchant or type of merchant, customer media preference or psychographic information (e.g., customer preference of NPR over Fox News), customers defined by the sequence of products that a consumer purchases (e.g., TV, computer, printer, ink), customer response to surveys, customer data collected by third parties (including credit bureaus), customers satisfied with a particular product or brand, customers who attrite, customers who make an insurance claim, customers who have been identified as providing a particular level of return on investment or return to a merchant based on marketing initiatives or purchase history, customers who have viewed a merchant's social network page, ad, and/or feed (e.g., a Facebook, MySpace, and/or LinkedIn page and/or a Twitter or RSS feed), other social network ad, television ad, customer's viewing of an advertising channel which lead to a sale or other action, customers who have a high or low opinion of a particular merchant's brand(s), or any other event or data point that may allow matching or joining with internal data.

Node 204 may supplement received data from data stores 206, 210 and 212 with third party data sources. For example, a third party data source may provide customer credit scores, social network histories (which include any information a social network may gather regarding a consumer, for example, posted messages, approximate age and gender of spouse, children and other members of household, pictures, past consumer geographic locations, patterns of past consumer geographic locations, propensity to engage in risky behaviors and the frequency of engaging in the same, marital status, substance use history, dating history, education level, present and past health status including disease status), public records, consumer transactions conducted using alternate payment systems, consumer health status, and any other data relating to consumers who may appear in the internal data. Data from third party data sources may be joined or appended to internal data relating to consumers. For example, if the internal data contains a record for consumer "A" and a third party data source has a history of A's postings on one of A's social network pages, all or a portion of the third party's data may join A's internal data.

Node 204 may then join or otherwise merge the received data from data stores 206, 210 and 212. Performing a join, for example, may be accomplished using any join function known in the art, as described herein. For example, a join may be performed to match records from one data set to another. For example, transaction date, transaction time, and transaction amount from data store 202 may be joined with transaction date, transaction time, and transaction amount from data store 206. The join may then return internal data related to the customer who engaged in the transaction in question. The join may utilize a range of data depending upon the desired results, and the join query may account for differences in time stamps across various systems. For example, if a join fails to return any results, the transaction time may be altered slightly in the event the internal data is a few seconds or minutes different from the first merchant data. As an example, for first merchant data in table first_merchant and internal data in table internal_data, the following query may be used to obtain a customer size of wallet for a customer who engaged in a transaction with the first merchant: SELECT customer_size_wallet, customer_household_income FROM internal_data WHERE first_merchant.transaction_time=internal_data.transaction_time AND first_merchant.transaction_amount=internal_data.transaction_amount AND first_merchant.transaction_date=internal_data.transaction_date.

In many cases, only one record will be returned, provided that the first merchant had one transaction for a given transaction time, date and amount. If multiple records are returned, other queries may be used to further match records, for example, by inserting transaction location.

Other data may be derived from the received data. For example, a consumer's social networking history may be queried for mentions of luxury brand names, and photo recognition software may be used to scan the consumer's posted social networking photos for the same. Consumers with high or low frequencies of occurrence may be isolated for further analytics. Photo recognition software may be used to scan the consumer's posted social networking photos for the gender and age of the consumer's spouse and children. Also for example, a consumer's social networking history may be queried for mentions of health status and/or disease state. These data, in combination with any internal data, may be useful in marketing medical and/or lifestyle products suited to that health status and/or disease state.

Figure 3:
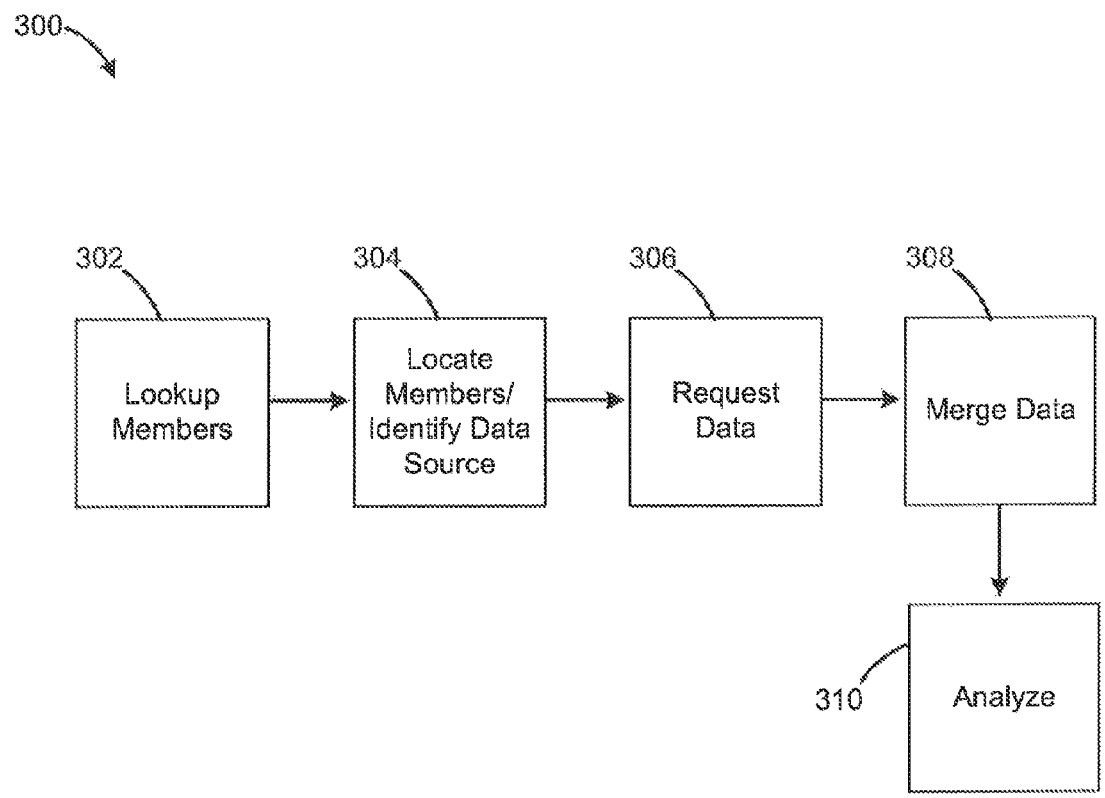
FIG. 3 illustrates a system, according to various embodiments.

With reference to FIG. 3, method of using a cooperative data exchange 300 is illustrated. A node looks up other nodes to access lookup members 302. The node then locates other nodes and selects which public facing data store from which to request data to locate members/identify data source 304. The node then requests data from the desired public facing data store(s) in request data 306. The node may then receive received data from the desired public facing data store(s). The node may process the received data, such as performing a merge or join on the received data to form a final data set. The final data set may then be analyzed in analyze 310. Any analytical process may be performed on the final data set.

The cooperative data exchange may thus be used to produce a final data set upon which analytics may be performed to produce analyzed data. The analytics performed may be used in any business or market segment that sells goods, services, or extends credit or otherwise evaluates the creditworthiness of a particular consumer. In various embodiments, businesses will be referred to herein as falling into one of three categories: financial services companies, retail companies, and other companies.

In various embodiments, transactional data relating to a consumer from a merchant may be received by a credit issuer. The credit issuer may build a profile of the consumer comprising transactional data. As discussed above, transactional data may comprise SKU data, so individual line items purchased by a consumer may be analyzed by the credit issuer. In various embodiments, transactional data may be combined with internal data, which as discussed above contains data relating to the time, place, and other circumstances of a consumer's transactions. Accordingly, the type of products, the merchants frequented, and the time and place of a consumer's transactions may be modeled.

A credit issuer may receive a credit approval request relating to a proposed transaction. This may occur in response to a consumer attempting to purchase an item from a merchant. The credit issuer may evaluate the likelihood that the proposed transaction is a fraudulent transaction. Stated another way, the credit issuer may evaluate the likelihood that the proposed transaction is being perpetrated by an unauthorized party. The credit issuer generally would prefer to deny such likely fraudulent transactions, though fraud detection systems that produce a high rate of "false positives" tend to alienate consumers because the consumer is not able to complete the transaction and must present an alternate form of payment. Moreover, a high rate of false positives may mean that the consumer uses a competing credit issuer to facilitate the transaction. A false positive may include a transaction that a fraud detection system determines is fraudulent even though the transaction is not, in fact, fraudulent.

In various embodiments, a credit approval request contains transactional data, though in various embodiments the credit approval request may not include transactional data and contain, for example, the time, place, and amount of the proposed transaction. Stated another way, in various embodiments, a credit approval request does not include SKU data.

Transactional data may be used to determine the likelihood that a proposed transaction is fraudulent. For example, a proposed transaction may be for a competing or complementary good as one recently purchased by the consumer. For example, a consumer who recently purchased a cable modem may be more likely to purchase a WiFi router. A consumer who recently purchased a suit may be more likely to purchase dress shoes or a dress shirt. A consumer who recently purchased a PC may be more likely to purchase a Mac, in anticipation of returning the PC. A consumer who purchased a cell phone two years prior to a proposed transaction may be more likely to purchase a new cell phone, given that many cell phone contracts expire after two years. A consumer who purchased a Mac may be more likely to purchase an iPad, iPhone, or iPod. A consumer who purchased an iPad within a month of its introduction may be more likely to purchase the latest iPad after its introduction. A consumer may tend to purchase fine jewelry periodically (e.g., every five years) to coincide with an anniversary or birthday. The correlation between past purchases and future purchases may be referred to as the level of conformance.

Conversely, transactional data may be used to identify transactions that are uncommon for a given consumer. For example, a consumer who has never purchased alcohol likely will not purchase alcohol in the future. A consumer who purchases airline tickets only near holidays will likely not purchase airline tickets at other times. A consumer who has not purchased an Apple product will likely not purchase from Apple's media store iTunes. A nonsmoking consumer will not likely purchase cartons of cigarettes. A male consumer may purchase women's clothing or accessories at certain times of the year (e.g., to coincide with a birthday or holiday) but will generally not purchase women's clothing or accessories at other times.

Transactional data may also indicate frequent purchases. A consumer may purchase a particular coffee drink at a given coffee shop on a regular or periodic basis. A consumer may purchase certain brands of clothing or fashion accessories every season. Changes to the items purchased, particularly changes made suddenly, may indicate fraud. For example, a consumer who often consumes turkey sandwiches at lunch time during the week is less likely to consume a beef dish at a full service restaurant at lunch time during the week.

In various embodiments, transactional data may be used to produce a conformance score. A conformance score may comprise a quantitative approach to determining whether or not a proposed transaction is in conformance with the transactional data for a given consumer. "In conformance" may comprise a conformance score indicating that the proposed transaction is more likely to conform than not to the proposed transaction. "Not in conformance" may comprise a conformance score indicating that the proposed transaction is less likely to conform than not to the proposed transaction. A conformance score may be computed by assessing the transactional data for similar or complementary purchases. The proposed transaction is then correlated to the transactional data.

Any statistical method may be employed to correlate the transaction data to the proposed transaction. For example, the least squares method may be used. Data fitting approaches may also be employed, such as regression analysis. In various embodiments, a conformance score may range from 1 to 10, 1 being least likely to be in conformance and 10 being most likely in conformance.

Crime data comprising frequently fraudulently purchased SKU data may also be used in fraud detection in various embodiments. Crime data may be compiled by credit issuers and/or merchants and shared via a cooperative data exchange. The crime data may comprise items that are frequently either purchased or attempted to be purchased using fraudulent means. An item's presence in crime data may indicate that a proposed transaction with such an item may be more likely to be fraudulent.

Figure 5:
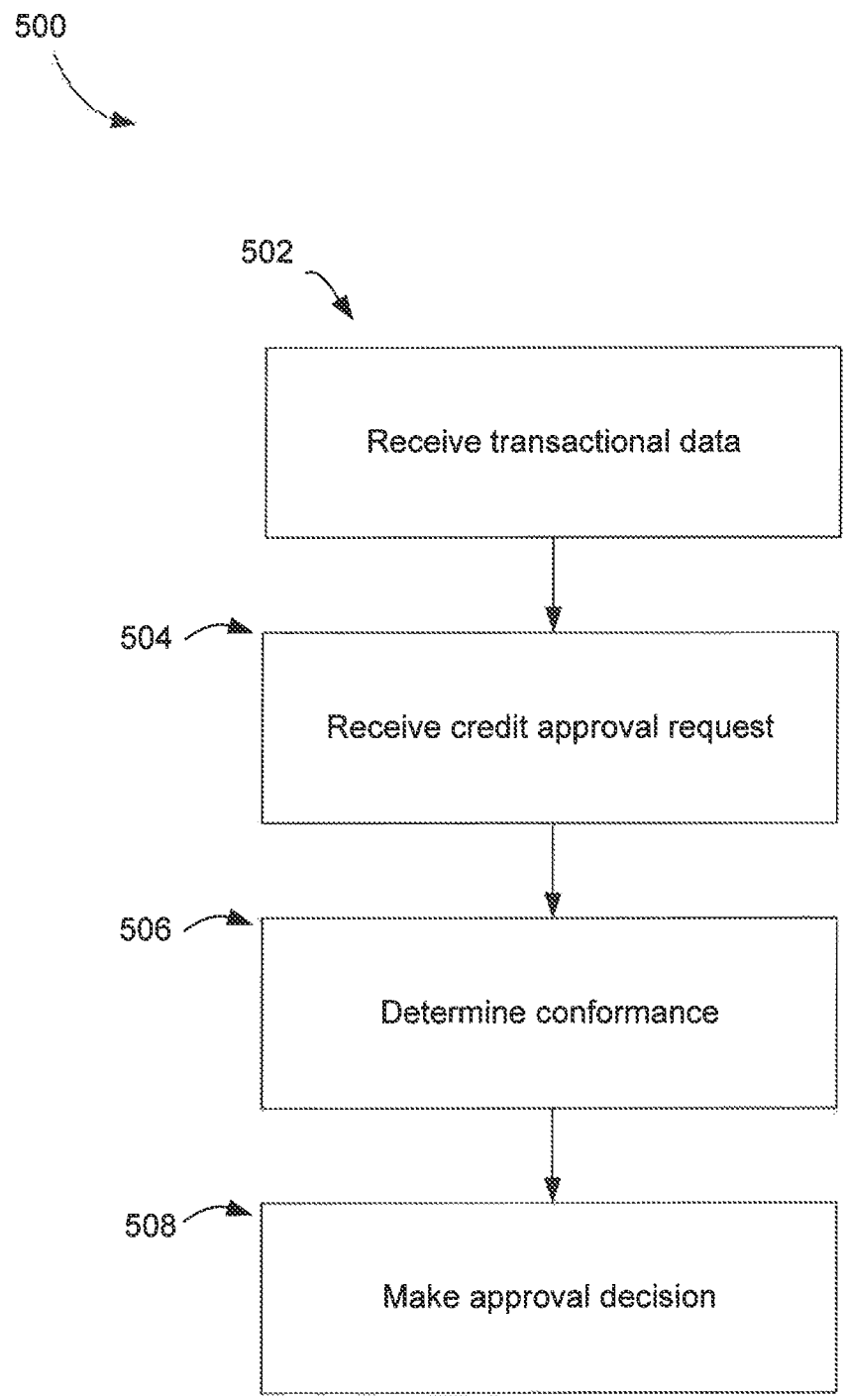
FIG. 5 illustrates a method, according to various embodiments.

With reference to FIG. 5, method 500 is shown in accordance with various embodiments. In step 502, transactional data is received. The transactional data may be received from a second node in a cooperative data exchange by a first node. The transactional data may be related to a consumer. Using various data joining techniques, the transactional data related to the consumer may be linked to other data relating to the consumer, such as internal data.

In step 504, a credit approval request relating to a proposed transaction is received. A first node may receive the credit approval request. The credit approval request may include the time, place, location, merchant and consumer that is involved in the proposed transaction. The credit approval request may include transactional data regarding the line items of the proposed transaction. In various embodiments, transactional data may be received concurrently with the credit approval request via a cooperative data exchange. Fraud detection methodologies may be applied to the credit approval request, as well as methodologies to verify that the proposed transaction may be funded appropriately.

In step 504, the proposed transaction is analyzed for conformance to the transactional data. As discussed above, such analysis may be qualitative. Certain items may be deemed too incompatible with prior purchased items and certain items may be present in crime data. As discussed above, such analysis may be quantitative. A conformance score may be determined in step 504 to measure the degree of conformance.

Step 508 includes the making of a credit approval decision. The decision may be upon the conformance or nonconformance of the proposed transaction to a consumer's transaction data. An approval decision may include an approval for the full amount of the proposed transaction, a partial amount of the same, or a denial.

Figure 6:
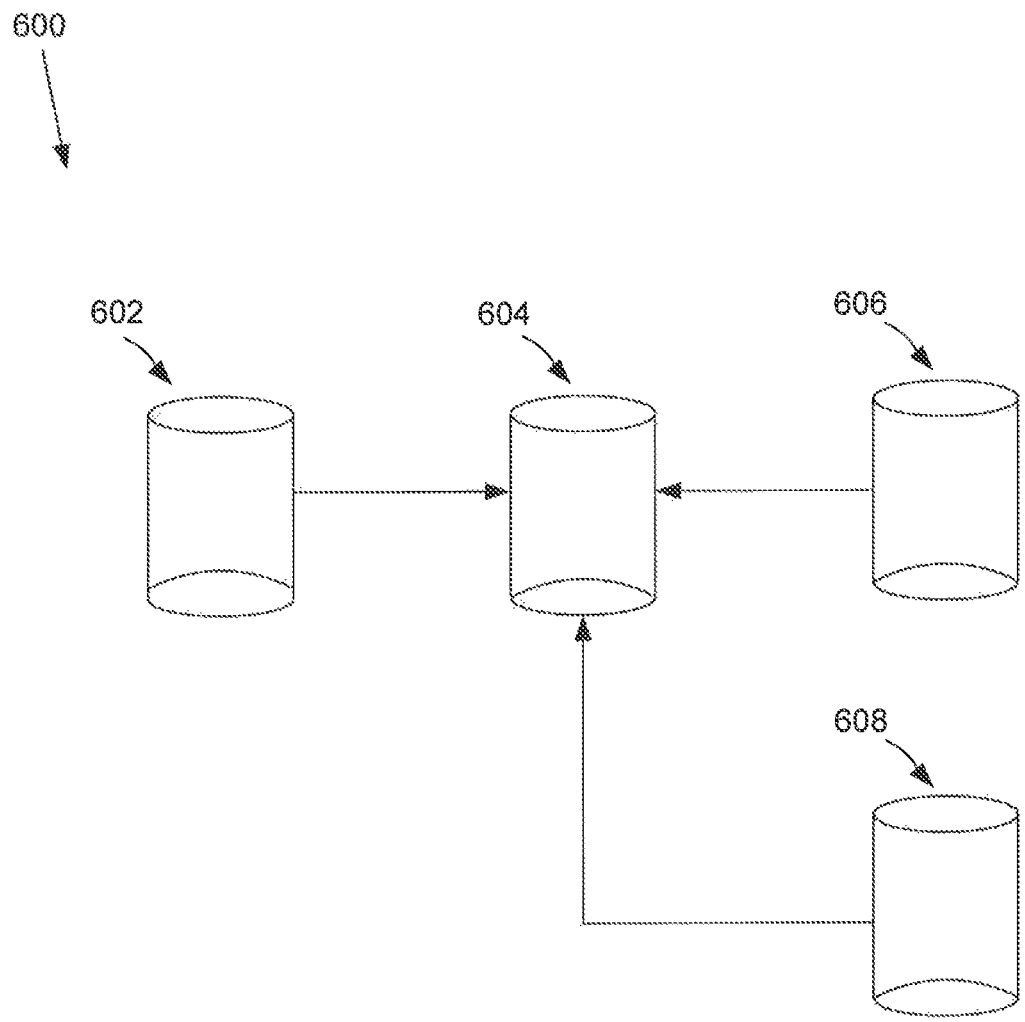
FIG. 6 illustrates a system, according to various embodiments.

With reference to FIG. 6, a system is shown in accordance with various embodiments. Node 604 is configured to receive transactional data from node 602. A credit approval request may be transmitted to node 604 by system 606, which may comprise a node in various embodiments. Node 608 is configured to provide crime data to node 604. Node 604 may be configured to determine conformance of a credit approval request to a set of transactional data relating to a consumer. Node 604 may also be configured to receive transaction data from other nodes.

The business cycle in each category may be divided into three phases: acquisition, retention, and disposal. The acquisition phase occurs when a business is attempting to gain new consumers. The acquisition phase includes, for example, targeted marketing, determining what items to offer a consumer, deciding whether to lend to a particular consumer and what the line size or loan should be, and deciding whether to buy a particular loan. The retention phase occurs after a consumer is already associated with the business. In the retention phase, the business interests shift to managing the consumer relationship through, for example, consideration of risk, determination of credit lines, cross-sell opportunities, increasing business from that consumer, and increasing the company's assets under management.

The disposal phase is entered when a business wishes to dissociate itself from a consumer or otherwise end the consumer relationship. The disposal phase can occur, for example, through settlement offers, collections, and sale of defaulted or near-default loans.

Financial services companies include, for example: banks and other lenders, mutual fund companies, financiers of leases and sales, life insurance companies, online brokerages, credit issuers, and loan buyers.

Banks and lenders can utilize the analyzed data in all phases of the business cycle. One exemplary use is in relation to home equity loans and the rating given to a particular bond issue in the capital market. Analyzed data may be useful in issuing home equity lines of credit and automobile loans in a similar manner.

For example, if the holder of a home equity loan borrows from the capital market, the loan holder issues asset-backed securities ("ABS"), or bonds, which are backed by receivables. The loan holder is thus an ABS issuer. The ABS issuer applies for an ABS rating, which is assigned based on the credit quality of the underlying receivables. One of skill in the art will recognize that the ABS issuer may apply for the ABS rating through any application means without altering the spirit and scope of the present invention. In assigning a rating, the rating agencies weigh a loan's probability of default by considering the lender's underwriting and portfolio management processes. Lenders generally secure higher ratings by credit enhancement. Examples of credit enhancement include over-collateralization, buying insurance (such as wrap insurance), and structuring ABS (through, for example, senior/subordinate bond structures, sequential pay vs. pari passu, etc.) to achieve higher ratings. Lenders and rating agencies may use certain characteristics the debtors of the underlying debt obligations into consideration when determining the appropriate level of credit enhancement. Thus, lenders and rating agencies, among others, may join a cooperative data exchange to obtain and/or join data from other sources with their own, for example, to assist in determining the appropriate level of credit enhancement.

During the acquisition phase of a loan, lenders may join a cooperative data exchange to obtain and/or join data from other sources with their own to improve their lending decisions. Before issuing the loan, lenders can obtain data relating to a given potential debtor and use the data to make credit extension evaluations. For example, a lender may join its own data with internal data from a transaction system and determine a potential debtor's size of wallet or a potential debtor's propensity to purchase goods or services associated with those who have poor credit histories. Evaluation leads to fewer bad loans and a reduced probability of default for loans in the lender's portfolio. For a given loan portfolio that has been originated using data analyzed from a cooperative data exchange in accordance with various embodiments, either a higher rating can be obtained with the same degree of over-collateralization, or the degree of over-collateralization can be reduced for a given debt rating. Thus, using data analyzed from a cooperative data exchange at the acquisition stage of the loan reduces the lender's overall borrowing cost and loan loss reserves.

During the retention phase of a loan, data analyzed from a cooperative data exchange can be used to track a consumer. Based on the trends observed, the lender can make various decisions regarding the consumer relationship.

The gaming industry can use data analyzed from a cooperative data exchange, for example, during the acquisition and retention phases of the business cycle. Casinos often extend credit to their wealthiest and/or most active players, also known as "high rollers." The casinos can use data analyzed from a cooperative data exchange to gain better insight into these consumer and adjust their accommodations to better fit their customer's needs. For example, casinos can gain insight into a customer's accommodation preferences or food preferences.

Communications providers, such as telephone service providers, often contract into service plans with their consumers. In addition to improving their targeted marketing strategies, communications providers can use data analyzed from a cooperative data exchange during the acquisition and retention phases to better market new phones and phone services. For example, a telephone service provider may target advertising to those consumers whose cellular phone contracts are about to expire.

Members of the travel industry can make use of data analyzed from a cooperative data exchange in the acquisition and retention stages of the business cycle. For example, a hotelier typically has a brand of hotel that is associated with a particular "star-level" or class of hotel. In order to capture various market segments, hoteliers may be associated with several hotel brands that are of different classes. During the acquisition phase of the business cycle, a hotelier may use the data analyzed from a cooperative data exchange to better target individuals that have appropriate spend capacities for various classes of hotels. During the retention phase, the hotelier may use the data analyzed from a cooperative data exchange to determine, for example, when a particular individual may be associated with increased spending overall or increased spending in a given industry, such as the travel industry. Based on that determination, the hotelier can market a higher class of hotel to the consumer in an attempt to convince the consumer to upgrade.

One of skill in the relevant art(s) will recognize that many of the above described applications of one or more consumer data cohort attributes may be utilized by other industries and market segments without departing from the spirit and scope of the present invention. For example, the strategy of using one or more consumer data cohort attributes to model an industry's "best consumer" and targeting individuals sharing characteristics of that best consumer can be applied to nearly all industries.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: internal data, client data; merchant data; financial institution data; and/or like data useful in the operation of the system. As those skilled in the art will appreciate, a computer may include an operating system (e.g., Windows NT, 95/98/2000, XP, Vista, OS2, UNIX, Linux, Solaris, MacOS, iOS, Android, etc.) as well as various conventional support software and drivers typically associated with computers. A user may include any individual, business, entity, government organization, software and/or hardware that interact with a system.

A web client includes any device (e.g., personal computer or smartphone or tablet computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, minicomputers, PC servers, pervasive computers, network sets of computers, personal computers, such as tablet computers (e.g., tablets running Android, iPads), iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, Opera, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile/XPN/Vista/7, OS2, UNIX, Linux, Solaris, MacOS, MacOS X, PalmOS, iOS, Android, etc.) as well as various conventional support software and drivers typically associated with computers. A web client may include any suitable personal computer, network computer, workstation, personal digital assistant, cellular phone, smartphone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of a system may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device), personal digital assistant/smartphone (e.g., iPhone®, Palm Pilot®, Blackberry®, and/or a device running Android), cellular phone, kiosk, etc., online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "issuer" or "credit issuer" may include a bank or other financial institution typically operating under regulations of a card issuing association or entity and which issues cards to cardmembers under a cardmember agreement for a cardmember account.

As used herein, "transmit" may include sending electronic data from one system component to another over a network connection. Additionally, as used herein, "data" may include encompassing information such as commands, queries, files, data for storage, and the like in digital or any other form.

As used herein, "card" includes a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

As used herein, "issue a debit", "debit" or "debiting" refers to either causing the debiting of a stored value or prepaid card-type financial account, or causing the charging of a credit or charge card-type financial account, as applicable.

Phrases or terms similar to "item" may include any good, service, information, experience, data, content, access, rental, lease, contribution, account, credit, debit, benefit, right, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems. Any form of encryption may be used to implement a secure channel, as described herein.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks. A transaction system may comprise a payment network.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots illustrated or described are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein.

The computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to a "credit approval request" may include a request by a consumer to either a credit issuer for the extension of credit or a financial institution for the disbursal of funds to fund a proposed transaction. The credit issuer may approve the request and fund the transaction or the credit issuer may decline the request. The credit issuer may also approve an amount less than the total amount of the proposed transaction. For example, a credit approval request may comprise a consumer using a transaction card in a proposed transaction with a merchant. Also for example, a credit approval request may comprise a consumer using a transaction card in a proposed transaction with a merchant, wherein the transaction card is a debit card and the financial institution holds a transaction account that holds cash or cash equivalents on behalf of the consumer.

Phrases similar to "vendor software" or "vendor" may include software, hardware and/or a solution provided from an external vendor (e.g., not part of the merchant) to provide value in the payment process (e.g., risk assessment).

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   receiving, at a first node and from a remote source over an internet, transactional data associated with a consumer,
   wherein the transaction data comprises SKUs in a proposed transaction,
   wherein the first node comprises a processor configured for credit approval and marketing analytics and a tangible, non-transitory memory,
   receiving, at the first node and from the remote source over the internet, at least one of:
   psychographic information related to the consumer or social media postings of the consumer;
   receiving, at the first node and from the remote source over the internet, a credit approval request associated with the consumer having an existing line of credit,
   wherein the credit approval request is associated with the proposed transaction,
   wherein the credit approval request comprises a request to utilize the existing line of credit;
   retrieving, by the first node, internal data from a private-facing data store,
   wherein the internal data comprises customer geographic information comprising:
      instantaneous geographic information obtained from a digital device comprising a GPS-equipped smartphone; and
      historical instantaneous geographic data obtained from the digital device comprising the GPS-equipped smartphone;
   wherein the internal data further comprises at least one of:
      prior transaction data comprising at least two of transaction amount, prior transaction time, prior transaction vendor or merchant, prior transaction vendor or merchant location, or prior vendor or merchant web address;
      prior consumer payment data comprising at least two of consumer payment dates, payment amounts, balance amount, or credit limit; or
      prior consumer interactions comprising at least two of records of consumer service calls, complaints, requests for credit line increase, questions, comments, dates of calls, reasons for calls, or summaries of calls;
   joining, by the first node, the internal data with the transactional data to create joined data;
   determining, by the first node, a conformance score of the joined data,
   wherein the conformance score comprises a correlation between the proposed transaction and at least the prior consumer interactions and at least one of the prior transaction data or the prior consumer payment data;
   at least one of approving or denying the credit approval request in response to the determination; and
   performing marketing analytics, by the first node,
   wherein the first node interfaces with photo recognition software,
   wherein the photo recognition software scans the consumer's social networking photos, conducts a biometric analysis and determines the gender and age of at least one of the consumer's spouse or children;
   delivering product marketing, by the first node and to the remote source over the internet, in response to the analytics.

2. The method of claim 1, wherein the transactional data is provided by a second node.

3. The method of claim 2, wherein the transactional data comprises data regarding a transaction between the consumer and a merchant.

4. The method of claim 2, wherein the second node is operated by a merchant.

5. The method of claim 1, further comprising receiving, at the first node, crime data wherein the crime data includes SKU data from fraudulently purchased items.

6. The method of claim 5, wherein the determining is in part based upon the crime data.

7. The method of claim 1, further comprising a risk mitigation action performed in response to the determining.

8. The method of claim 1, wherein the first node is operated by a merchant.

9. A system for marketing analytics and fraud detection, the system comprising:
   a first node comprising a non-transitory memory communicating with a processor for credit approval and marketing analytics, the non-transitory memory having instructions stored thereon that, in response to execution by the processor, cause the processor to perform operations comprising:
   receiving, from a remote source over an internet, transactional data comprising SKUs in a proposed transaction associated with a consumer having an existing line of credit;
   receiving, at the first node and from the remote source over the internet, at least one of:
   psychographic information related to the consumer or social media postings of the consumer;
   receiving, from the remote source over the internet, a credit approval request associated with the consumer,
   wherein the credit approval request is associated with the proposed transaction,
   wherein the credit approval request comprises a request to utilize the existing line of credit;
   retrieving internal data from a private-facing data store, wherein the internal data comprises customer geographic information comprising:

instantaneous geographic information obtained from a digital device comprising a GPS-equipped smartphone; and historical instantaneous geographic data obtained from the digital device comprising the GPS-equipped smartphone;

the internal data further comprising at least one of:

prior transaction data comprising at least two of transaction amount, prior transaction time, prior transaction vendor or merchant, prior transaction vendor or merchant location, or prior vendor or merchant web address;

prior consumer payment data comprising at least two of consumer payment dates, payment amounts, balance amount, or credit limit; or prior consumer interactions comprising at least two of records of consumer service calls, complaints, requests for credit line increase, questions, comments, dates of calls, reasons for calls, or summaries of calls;

joining, by the first node, the internal data with the transactional data to create joined data;

determining, by the first node, a conformance score of the joined data, wherein the conformance score comprises a correlation between the proposed transaction and at least the prior consumer interactions and at least one of the prior transaction data or the prior consumer payment data;

at least one of approving or denying the credit approval request in response to the determination;

performing marketing analytics, by the first node, wherein the first node interfaces with photo recognition software, wherein the photo recognition software scans the consumer's social networking photos, conducts a biometric analysis and determines the gender and age of at least one of the consumer's spouse or children;

delivering product marketing, by the first node and to the remote source over the internet, in response to the analytics.

10. The system of claim 9, wherein the transactional data is provided by a second node.

11. The system of claim 9, the operations further comprising receiving, at the first node, crime data wherein the crime data includes SKU data from fraudulently purchased items.

12. An article of manufacture including a non-transitory computer readable storage medium having instructions stored thereon that, in response to execution by a first node comprising a non-transitory memory communicating with a processor configured for credit approval and marketing analytics, cause the first node to perform operations comprising:

receiving, from a remote source over an internet, transactional data comprising SKUs in a proposed transaction associated with a consumer having an existing line of credit;

receiving, from the remote source over the internet, at least one of: psychographic information related to the consumer or social media postings of the consumer;

receiving, from the remote source over the internet, a credit approval request associated with the consumer, wherein the credit approval request is associated with the proposed transaction, wherein the credit approval request comprises a request to utilize the existing line of credit;

retrieving internal data from a private-facing data store, wherein the internal data comprises customer geographic information comprising:

instantaneous geographic information obtained from a digital device comprising a GPS-equipped smartphone; and historical instantaneous geographic data obtained from the digital device comprising the GPS-equipped smartphone;

wherein the internal data further comprises at least one of:

prior transaction data comprising at least two of transaction amount, prior transaction time, prior transaction vendor or merchant, prior transaction vendor or merchant location, or prior vendor or merchant web address;

prior consumer payment data comprising at least two of consumer payment dates, payment amounts, balance amount, or credit limit; or prior consumer interactions comprising at least two of records of consumer service calls, complaints, requests for credit line increase, questions, comments, dates of calls, reasons for calls, or summaries of calls;

joining the internal data with the transactional data to create joined data;

determining a conformance score of the joined data, wherein the conformance score comprises a correlation between the proposed transaction and at least the prior consumer interactions and at least one of the prior transaction data or the prior consumer payment data; and at least one of approving or denying the credit approval request in response to the determination; and performing marketing analytics, wherein the first node interfaces with photo recognition software, wherein the photo recognition software scans the consumer's social networking photos, conducts a biometric analysis and determines the gender and age of at least one of the consumer's spouse or children;

delivering product marketing, by the first node and to the remote source over the internet, in response to the analytics.

* * * * *